United States Patent
Sugahara (10) Patent No.: US 7,104,485 B2
(45) Date of Patent: Sep. 12, 2006

(54) SPINNING-REEL SOUNDING MECHANISM

(75) Inventor: Ken'ichi Sugahara, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/143,570

(22) Filed: Jun. 3, 2005

(65) Prior Publication Data
US 2005/0274838 A1    Dec. 15, 2005

(30) Foreign Application Priority Data
Jun. 9, 2004   (JP)   ............................. 2004-171291
Jun. 9, 2004   (JP)   ............................. 2004-171292

(51) Int. Cl.
*A01K 89/01*   (2006.01)

(52) U.S. Cl. .................................... 242/307

(58) Field of Classification Search ......... 242/305–307
See application file for complete search history.

(56) References Cited

U.S. PATENT DOCUMENTS

| 4,173,317 A | * | 11/1979 | Hamayasu et al. | ......... 242/306 |
| 4,549,702 A | * | 10/1985 | Councilman | ................ 242/246 |
| 5,022,606 A | | 6/1991 | Hashimoto | |
| 5,279,477 A | * | 1/1994 | Yoshikawa | ................... 242/306 |
| 6,189,822 B1 | | 2/2001 | Ikuta | |
| 6,688,545 B1 | * | 2/2004 | Kitajima et al. | ............. 242/306 |
| 6,971,601 B1 | * | 12/2005 | Sugawara | .................... 242/307 |
| 2003/0138866 A1 | | 7/2003 | Kitajima et al. | |
| 2004/0041045 A1 | | 3/2004 | Sugawara | |
| 2004/0206840 A1 | | 10/2004 | Kitajima | |

FOREIGN PATENT DOCUMENTS

| EP | 1329157 A1 | 1/2003 |
| JP | 2002-345368 | 3/2002 |
| JP | 2004-81097 | 3/2004 |

* cited by examiner

*Primary Examiner*—Emmanuel M Marcelo
(74) *Attorney, Agent, or Firm*—Global IP Counselors, LLP (57) ABSTRACT

A spinning-reel sounding mechanism for emitting sound when a spool spins in a fishing-line reel-out direction includes a spool shaft, an annular member, a tubular first sounding part, a second sounding part and a rotation-restricting member. The annular member is non-rotatably and immovably coupled to the spool shaft at a rearward portion of the spool shaft. The first sounding part is rotatably coupled to the annular member along an outer periphery of the annular member. The second sounding part repeatedly collides with the first sounding part to emit sound when a spool rotates in the fishing-line reel-out direction. The rotation-restricting member is disposed between the annular member and the first sounding part for restricting rotation of the first sounding part.

20 Claims, 10 Drawing Sheets

SPINNING-REEL SOUNDING MECHANISM

CROSS-REFERENCE TO RELATED APPLICATIONS

This application claims priority to Japanese Patent Application Nos. 2004-171292 and 2004-171291. The entire disclosures of Japanese Patent Application Nos. 2004-171292 and 2004-171291 are hereby incorporated herein by reference.

BACKGROUND OF THE INVENTION

Field of the Invention

The present invention generally relates to a spinning-reel sounding mechanism. More particularly, the present invention relates to a spinning-reel sounding mechanism that emits sound by means of relative rotation between a spool for winding-in and reeling-out fishing line and a spool shaft that is non-rotatable with respect to a reel unit.

Generally, spinning reels are furnished with a reel unit having a handle, a rotor and a spool rotatably coupled to a spool shaft. The spool can freely travel back and forth with respect to the reel unit and includes a bobbin trunk portion and a large-diameter cylindrical skirt. The large-diameter cylindrical skirt is provided at a rearward end of the bobbin trunk portion. Fishing line is wound around an outer-circumference of the bobbin trunk portion. A spool retainer portion is disposed at the rearward end of the bobbin trunk portion and non-rotatably coupled to the spool shaft. The spool retainer portion is for restricting a rearward movement of the spool. Front drag-type spinning reels have a drag mechanism that includes a plurality of drag plates, a sounding mechanism for emitting sound when the drag mechanism operates and so forth in the interior of the bobbin trunk portion. (See, for example, Japanese Publication No. 2004-81097.)

In one type of sounding mechanism, the spool retainer portion disposed at the rear end of the bobbin trunk portion also serves as a sounding mechanism. The sounding mechanism of this type is furnished with a plate-shaped member of synthetic resin that is fitted at the rearward end of the bobbin trunk portion and a circular member brought into contact with the plate-shaped member to emit sound. An inner-periphery of the circular member engages with the spool shaft non-rotatably and immovably. The circular member functions as a spool retainer portion for restricting rearward movement of the spool. Jagged portions are formed on an outer circumference of the circular member. Relative rotation of the plate-shaped member causes the jagged portions to collide with the plate-shaped member to emit sound.

In the foregoing conventional sounding mechanism, the circular member has jagged portions formed on the outer circumference, by which sound issues when the drag mechanism operates, i.e., when the spool spins in the fishing-line reel-out direction. The sounding mechanism is also permitted to emit sound when the angler rotates the spool in the opposite direction to the fishing-line reel-out direction, i.e., when the spool is rotated in the fishing-line reel-in direction.

During fishing, in order to confirm the operation of the drag mechanism, it is necessary to allow the sound mechanism to emit sound only when the spool spins in the fishing-line reel-out direction. Moreover, because the angler does not let the spool rotate in the fishing-line reel-in direction during actual fishing, it is useless to issue sound at that time and the sound that issues when the spool is rotated in the fishing-line reel-in direction is superfluous.

In view of the above, it will be apparent to those skilled in the art from this disclosure that there exists a need for an improved spinning-reel sounding mechanism that emits sound only when the spool spins in the fishing-line reel-out direction. This invention addresses this need in the art as well as other needs, which will become apparent to those skilled in the art from this disclosure.

SUMMARY OF THE INVENTION

An object of the present invention is to provide a spinning-reel sounding mechanism that produces a sound when the spool spins in the fishing-line reel-out direction. Another object of the present invention is to provide a spinning-reel sounding mechanism that does not produce a sound when the spool spins in the fishing-line reel-in direction.

A spinning-reel sounding mechanism according to a first aspect of the present invention is a spinning-reel sounding mechanism that includes a non-rotatable spool shaft, an annular member, a tubular first sounding part, a second sounding part and a rotation-restricting member. The annular member is non-rotatably coupled to the spool shaft and is immovable in an axial rearward direction of the spool shaft. The tubular first sounding part is rotatably coupled to the annular member along an outer periphery of the annular member. The tubular first sounding part has a plurality of saw-tooth portions circumferentially spaced on an outer periphery of the first sounding part. Each of the saw-tooth portions are configured and arranged in a saw-tooth shape that permits a spool to rotate only in a fishing-line reel-out direction. The second sounding part is configured and arranged to be coupled to the spool to enable a distal end of the second sounding part to abut at least one of the saw-tooth portions in order to emit sound by the distal end repeatedly colliding with the saw-tooth portions when the spool rotates in the fishing-line reel-out direction. The rotation-restricting member is disposed between the annular member and the first sounding part for restricting rotation of the first sounding part.

The sounding mechanism produces sound by means of relative rotation between the first sounding part and the second sounding part when the spool spins in the fishing-line reel-out direction. The first sounding part is formed so as to permit the spool to rotate in the fishing-line reel-out direction. Therefore, the second sounding part abuts the first sounding part and produces sound only when the drag mechanism operates, i.e., only when the spool spins in the fishing-line reel-out direction. Specifically, the sounding mechanism is configured so that it issues sound only when the spool spins in the fishing-line reel-out direction but does not issue sound when the spool spins in the fishing-line reel-in direction. Thus, with such a configuration, the mechanism is allowed to emit sound when the spool spins in the fishing-line reel-out direction.

The first sounding part has a plurality of saw-tooth portions formed in a saw-tooth shape that produces sound only when the spool spins in the fishing-line reel-out direction. Therefore, sound performance, such as movement of a pawl and pitch, is remarkably improved over conventional spinning reels in which a sounding mechanism issues sound when the spool spins either in the fishing-line reel-out direction or the fishing-line reel-in direction. Contact portions between the first sounding part and the second sounding part are formed in a symmetrical shape.

A spinning-reel sounding mechanism according to a second aspect of the present invention is the spinning-reel sounding mechanism as set forth in the first aspect, wherein the rotation-restricting member is coupled to the first sounding part by biasing the rotation-restricting member against the first sounding part. In this case, the first sounding part is reliably prevented from rotating by providing, for example, a spring member or an elastic member between the annular member and the first sounding part.

A spinning-reel sounding mechanism according to a third aspect of the present invention is the spinning-reel sounding mechanism as set forth in the second aspect, wherein the first sounding part further has a groove portion formed circumferentially along its inner-peripheral surface. The rotation-restricting member is fitted into the groove portion in a state in which the rotation-restricting member is biased against the first sounding part. In this case, the mounting of the rotation-restricting member is made easier by fitting the rotation-restricting member to the groove portion.

A spinning-reel sounding mechanism according to a fourth aspect of the present invention is the spinning-reel sounding mechanism as set forth in the third aspect, wherein the annular member has a notch formed by cutting out a portion of its outer periphery. The rotation-restricting member includes a filamentous element having a bent end that is latched into the notch. In this case, the rotation-restricting member can be provided inexpensively.

A spinning-reel sounding mechanism according to a fifth aspect of the present invention is the spinning-reel sounding mechanism as set forth in any one of the second through fourth aspects, wherein the rotation-restricting member includes a spring member bent into a substantially polygonal shape. In this case, biasing force is obtained with a simple configuration by bending the spring element into, for example, a substantially pentagonal or hexagonal shape.

A spinning-reel sounding mechanism according to a sixth aspect of the present invention is the spinning-reel sounding mechanism as set forth in any one of the first through fifth aspects, wherein the second sounding part has a pawl member pivotably coupled to the spool to enable a forward end of the pawl member to abut the saw-tooth portions and a spring element for urging the forward end of the pawl member against the saw-tooth portions. In this case, the first sounding part and the second sounding part are brought into contact with a simple configuration.

A spinning reel according to a seventh aspect of the present invention is a spinning reel that includes a handle, a reel, a rotor, a spool and a spinning-reel sounding mechanism. The reel unit is rotatively support the handle. The rotor is rotatively supported on a front of the reel unit. The spool is disposed at a front of the rotor. The spinning-reel sounding mechanism is for producing sound by relative rotation between the spool and the reel unit and includes a non-rotatable shaft, an annular member, a tubular first sounding part, a second sounding part and a rotation-restricting member. The annular member is non-rotatably coupled to the spool shaft and is immovable in an axial rearward direction of the spool shaft. The tubular first sounding part is rotatably coupled to the annular member along an outer periphery of the annular member. The tubular first sounding part has a plurality of saw-tooth portions circumferentially spaced on an outer periphery of the first sounding part. Each of the saw-tooth portions are configured and arranged in a saw-tooth shape that permits the spool to rotate only in a fishing-line reel-out direction. The second sounding part is configured and arranged to be coupled to the spool to enable a distal end of the second sounding part to abut at least one of the saw-tooth portions in order to emit sound by the distal end repeatedly colliding with the saw-tooth portions when the spool rotates in the fishing-line reel-out direction. The rotation-restricting member is disposed between the annular member and the first sounding part for restricting rotation of the first sounding part.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
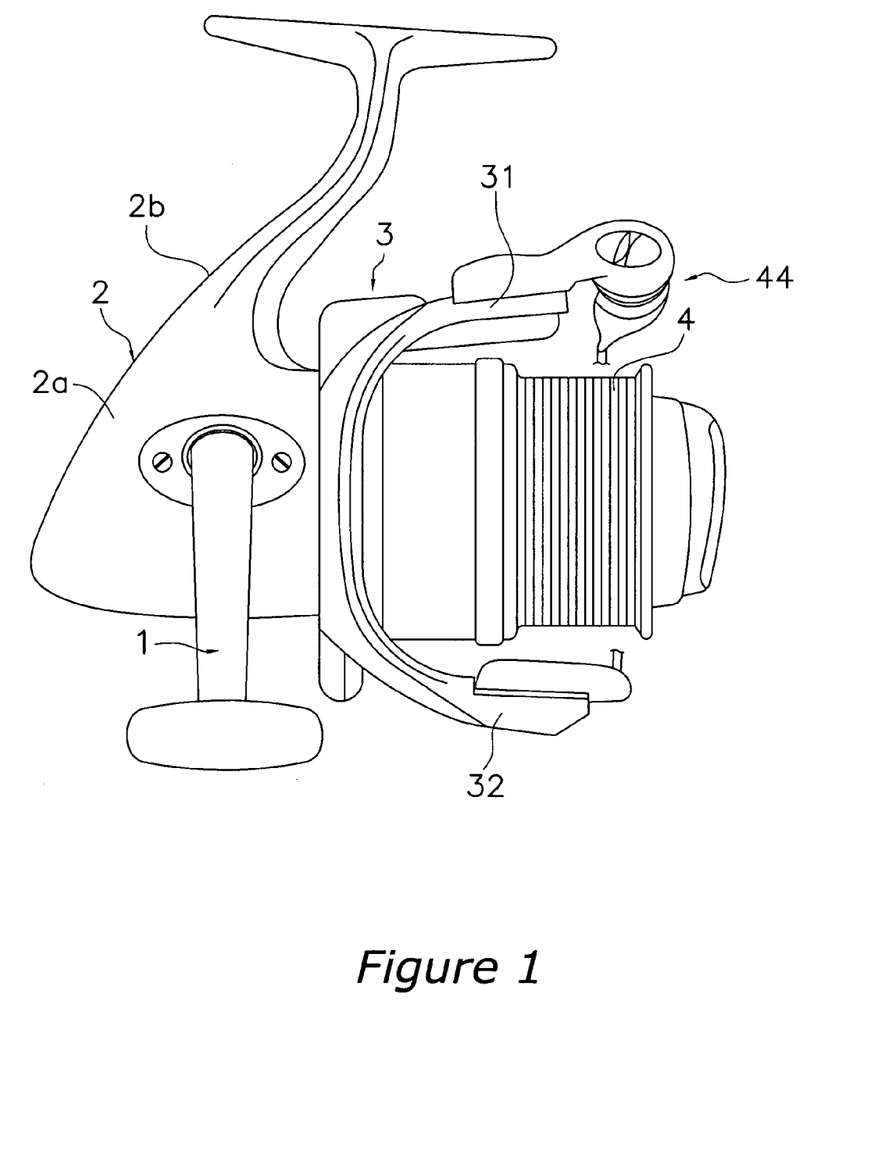
FIG. 1 is a side elevational view of a spinning reel equipped with a spinning-reel sounding mechanism according to one embodiment of the present invention.

Referring initially to FIG. 1, a spinning reel is illustrated in accordance with a first embodiment of the present invention. The spinning reel includes a handle 1, a reel unit 2, a rotor 3, a spool 4 and a spinning-reel sounding mechanism 90. The reel unit 2 rotatably supports the handle 1. The rotor 3 is rotatably supported in front of the reel unit 2. The spool 4 is for winding fishing line onto an outer peripheral surface of the spool 4. The spool 4 is disposed so as to freely reciprocate at the front of the rotor 3.

Figure 2:
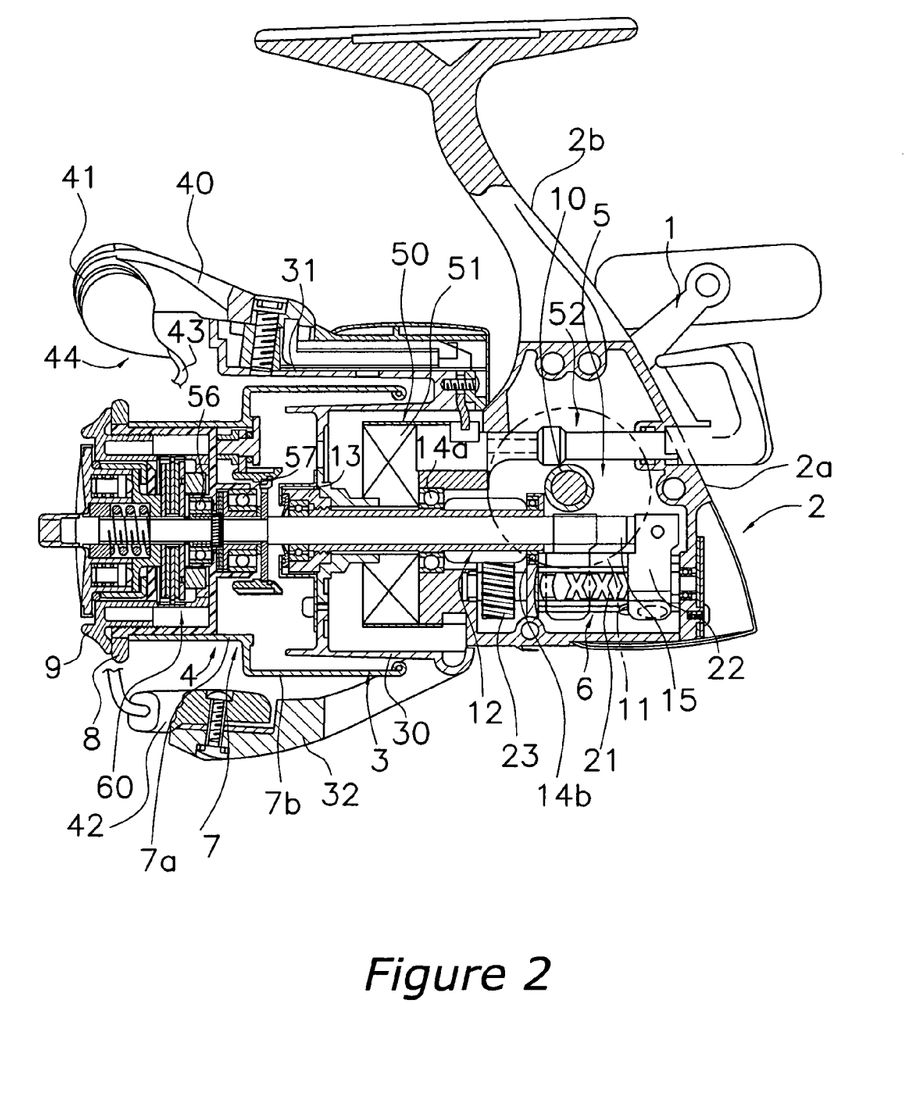
FIG. 2 is a side cross-sectional view of the spinning reel equipped with a spinning-reel sounding mechanism from the opposite side illustrated in FIG. 1 according to one embodiment of the present invention.

The reel unit 2 has a reel body 2a and a rod-mounting leg 2b. The rod-mounting leg 2b extends diagonally up and frontward from the reel body 2a. The reel body 2a has, as illustrated in FIG. 2, a hollow cavity in the interior thereof. Provided in the hollow cavity is a rotor drive mechanism 5 and an oscillating mechanism 6. The rotor drive mechanism 5 rotates the rotor 3 in cooperation with a rotation of the handle 1. The oscillating mechanism 6 winds—in the fishing line uniformly by shifting the spool 4 back and forth.

The rotor drive mechanism 5 has a master gear 11 and a pinion gear 12. The handle 1 is fixed to the master gear 11. The master gear 11 rotates together with the handle 1. The pinion gear 12 meshes with the master gear 11. The pinion gear 12 is cylindrically shaped. A front portion of the pinion gear 12 extends through the center of the rotor 3 and is fixed to the rotor 3 by a nut 13. The pinion gear 12 has an axial length and is rotatably supported by first and second bearings 14a and 14b. The first bearing 14a supports the pinion gear 12 at an axial intermediate portion and the second bearing 14b supports the pinion gear 12 at an axial rearward end.

Figure 3:
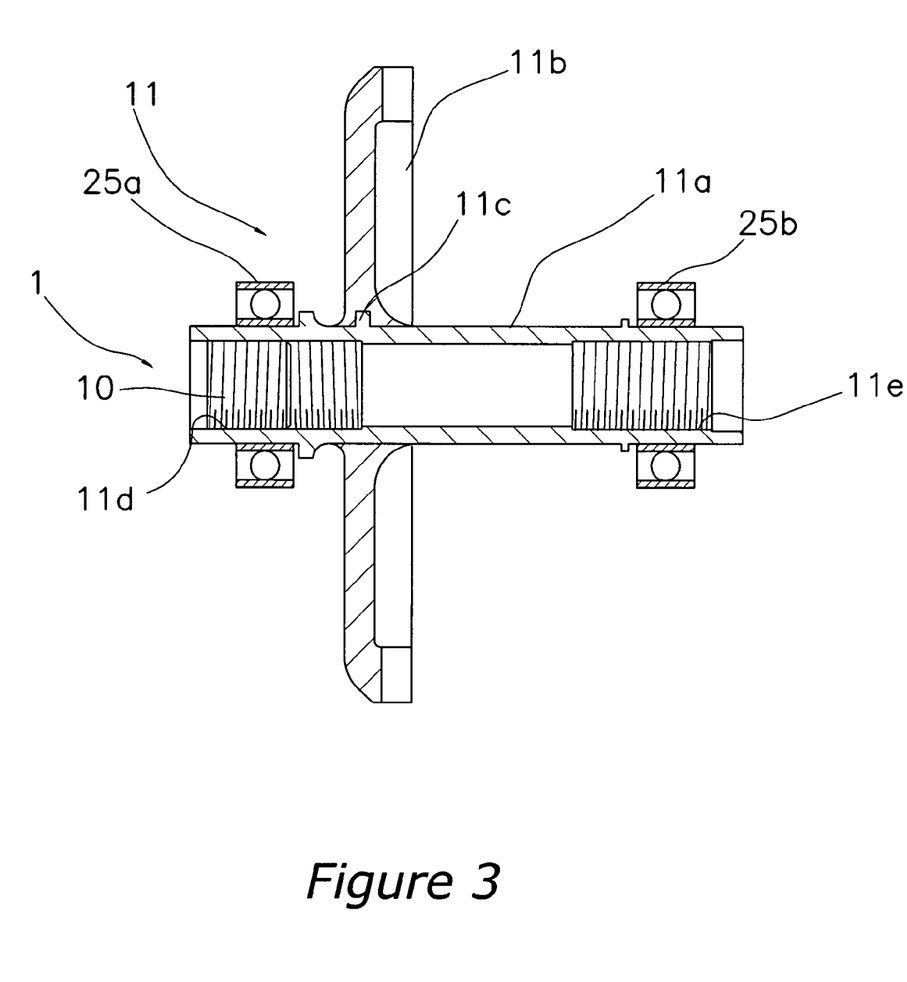
FIG. 3 is a cross-sectional view of a master gear for the spinning reel illustrated in FIGS. 1 and 2.

Referring to FIG. 3, the master gear 11 has a shaft part 11a and a gear part 11b. The shaft part 11a is a tubular member rotatably mounted to the reel unit 2 with third and fourth bearings 25a and 25b, which are fitted to a first and second boss portion (not shown) formed on the reel unit 2. The shaft part 11a is formed by machining an Al—Cu aluminum alloy such as A2011 (free-machining alloy) or A2017 (duralumin alloy). The master gear 11 further includes a projection 11c and first and second female threaded portions 11d and 11e. The first and second female-threaded portions 11d and 11e are in an inner circumferential surface of the shaft part 11a. The first and second female-threaded portions 11d and 11e are disposed at opposite ends of the shaft part 11a. A handle shaft 10 of the handle 1 is threaded into either first or second female-threaded portions 11d or 11e of the shaft part 11a. The first and second female-threaded portions 11d and 11e are threaded such that the threads are tightened when the handle 1 is rotated in a line reel-in direction. Thus, the first female-threaded portion 11d is a left-hand thread, whereas the female-threaded portion 11e is a right-hand thread. It should be noted that the handle 1 can be attached to either end of the shaft part 11a. In FIGS. 1–3, the handle 1 is attached to the first female-threaded portion 11d via the handle shaft 10. Because the first and second female-threaded portions 11d and 11e have different tightening directions, different handle shafts 10 are made available for specific use in attaching to the respective sides.

The gear part 11b is a disk-shaped member that is insert-molded with the shaft part 11a by die-casting. The gear part 11b is located between the third and fourth bearings 25a and 25b. The gear part 11b is disposed on an outer periphery of the shaft part 11a. The gear part 11b is a face gear having a toothed portion that meshes with the pinion gear 12. The gear part 11b is formed by die-casting in which a molten aluminum alloy, such as type 12 (ADC 12) or type 10 (ADC 10), is poured into a mold with the shaft part 11a inserted therein. The projection 11c is provided on the outer periphery of the shaft part 11a. The projection 11c projects radially outwardly. The gear part 11b is formed on the projection 11c such that the projection 11c prevents the gear part 11b from turning relative to the shaft part 11a or moving along the axial direction.

Figure 4:
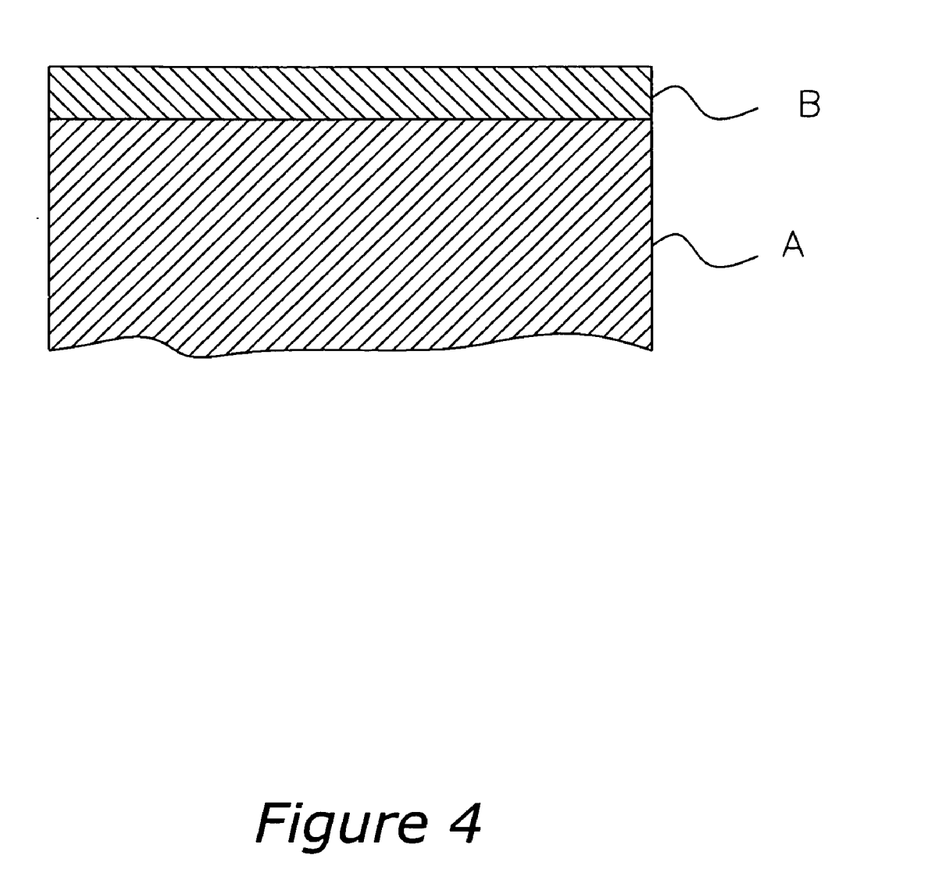
FIG. 4 is a schematic cross-sectional view of the master gear illustrated in FIG. 3 for the spinning reel illustrated in FIGS. 1 and 2.

Both the shaft part 11a and the gear part 11b are made of aluminum alloy. Referring to FIG. 4, the shaft part 11a and the gear part 11b are collectively referred to as master-gear main components A. The shaft part 11a and the gear part 11b are schematically illustrated in FIG. 4 as master-gear main components A. The surfaces of the master-gear main components A are subjected unitarily to an anodic oxidation process after they have been insert-molded. By the anodic oxidation process, an anodized aluminum B is formed on the surfaces of the master-gear main components A. When the master-gear main components A undergo electrolysis in a solution such as sulfuric acid, the master-gear main components A become an anode and a surface film forms because of the oxygen generated at the anode. The anodized aluminum B is formed through this anodic oxidation of aluminum alloy. Corrosion resistance is improved easily and reliably by unitarily subjecting the shaft part 11a and the gear part 11b to an anodic oxidation process.

Figure 5:
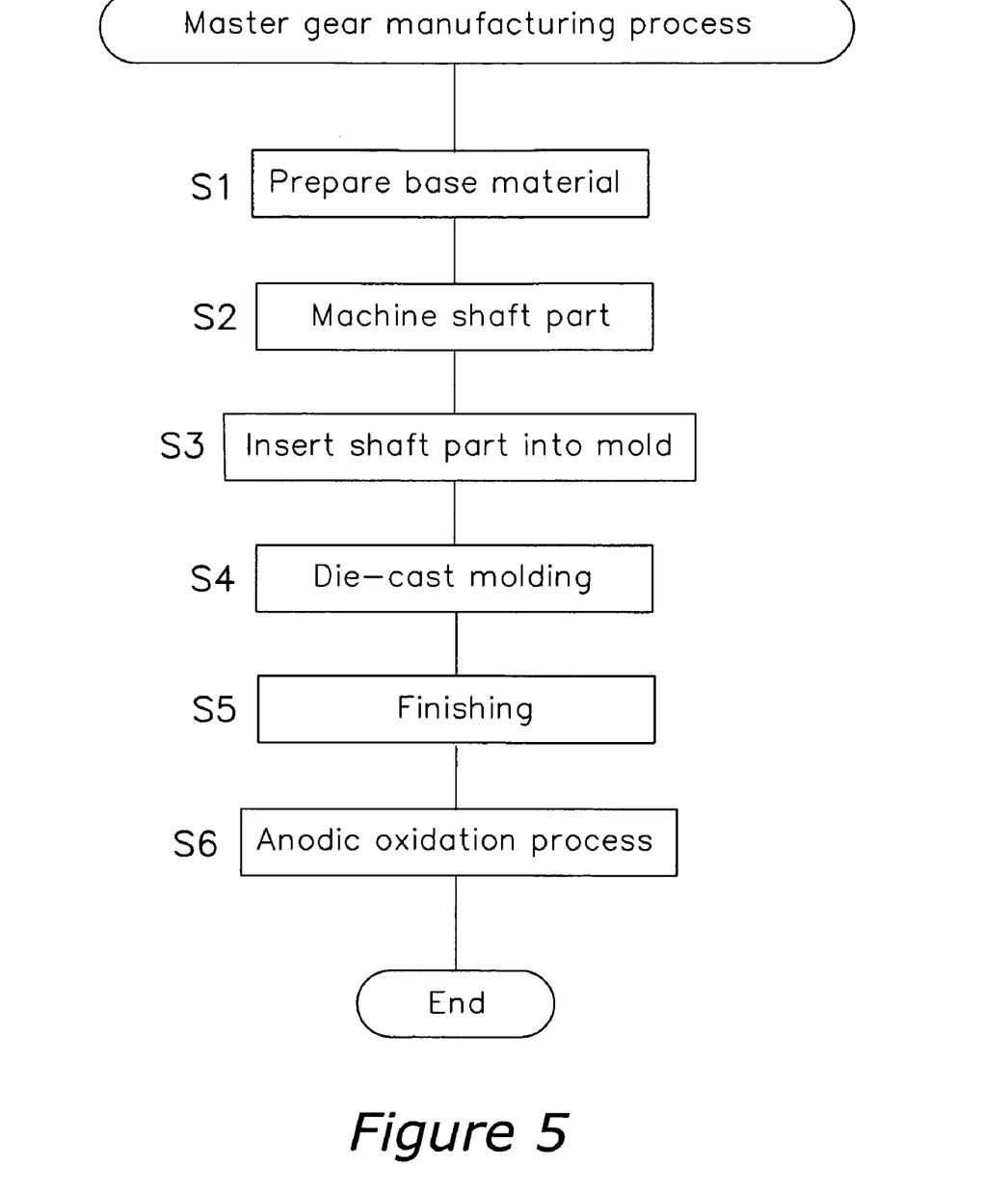
FIG. 5 is a flow-chart illustrating a manufacturing process of the master gear illustrated in FIGS. 3 and 4 for the spinning reel illustrated in FIGS. 1 and 2.

A master gear manufacturing process for manufacturing the master gear 11 and anodic oxidation of the master-gear main components A is shown in a flow chart in FIG. 5 and described below.

First, a rod-shaped base member made from aluminum alloy is prepared in step S1. Next, in step S2, the rod-shaped member of aluminum alloy is subjected to a machining process using a NC lathe to form the tubular shaft part 11a. The first and second female-threaded portions 11d and 11e are machined into the tubular shaft part 11a. Then, the projection 11c is formed by further machining the shaft part 11a. Next, in step S3, the shaft part 11a is inserted into a mold. In step S4, molten aluminum alloy is poured into the mold to die-cast the gear part 11b. Next, in step S5, unwanted portions such as the spur gate portion of the mold are eliminated and a finishing process such as polishing is carried out. Then, in step S6, the surfaces of the shaft part 11a and the gear part 11b, as master-gear main components A, are subjected unitarily to the anodic oxidation process. This manufacturing process produces the lightweight master gear 11 that is of high strength.

It will be apparent from this disclosure that it is conceivable to form the shaft part 11a and the gear part 11b of the master gear 11 integrally by die-casting to further facilitate the formation of the gear part 11b. Die-casting the shaft part 11a may cause the first and second female-threaded portions 11d and 11e to be stripped easily, thereby reducing the strength of the shaft part 11a.

To avoid this problem, it is conceivable to form the shaft part 11a of the master gear 11 from a different material, such as a stainless-steel alloy. In this case, however, the weight of the shaft part 11a increases, thereby inhibiting overall weight reduction since stainless-steel alloy has a greater specific gravity than aluminum alloy.

Overall weight reduction can be achieved in the master gear 11 and its components because all are formed of an aluminum alloy. The first and second female threaded portions 11d and 11e, which are machined before the shaft part 11a is insert-molded with the gear part 11b, cause the strength of the shaft part 11a to be higher. In comparison, the first and second female threaded portions 11d and 11e, which are formed after the shaft part 11a has already been molded by die-casting, do not cause the strength of the shaft part 11a to be higher. Furthermore, formation of the gear part 11b is easier since the gear part 11b is insert-molded with the shaft part 11a by die-casting.

The shaft part 11a and the gear part 11b may be formed from the same kind of aluminum alloy. However, the types of aluminum alloy are not limited to those mentioned in the foregoing embodiment.

Other surface treatments or coating processes may be performed instead of the anodic oxidation process. Furthermore, another surface treatment or coating process may be further carried out after performing the anodic oxidation process.

Referring to FIGS. 2, 6, 7 and 10, a spool shaft 15 includes a spool female threaded-portion 15a and a non-circular portion 15b. The spool shaft 15 is coupled to the center of the spool 4 via a drag mechanism 60 for shifting the spool 4. The non-circular portion 15b is formed at a forward end of the spool shaft 15 and has a non-circular cross section. The non-circular portion 15b of the spool shaft 15 has an outer circumferential cross section formed into a substantially elliptical shape with both sides cut away.

Referring to FIG. 2, the oscillating mechanism 6 is a mechanism for shifting the spool shaft 15 back and forth. The oscillating mechanism 6 includes a worm shaft 21, a slider 22, and an intermediate gear 23. The intermediate gear 23 is fastened onto a forward end of the worm shaft 21. The worm shaft 21 is disposed parallel to and below the spool shaft 15. The slider 22 shifts back and forth along the worm shaft 21. A rearward end of the spool shaft 15 is non-rotatably fastened to the slider 22. The intermediate gear 23 meshes with the pinion gear 12.

Referring to FIGS. 1 and 2, the rotor 3 includes a cylindrical portion 30, a first rotor arm 31 and a second rotor arm 32. The second rotor arm 32 is disposed at a side of the cylindrical portion 30 directly opposite of the first rotor arm 31. The cylindrical portion 30, the first rotor arm 31, and the second rotor arm 32 are integrally formed together and are made of, for example, an aluminum alloy.

A bail arm 44 guides the fishing line onto the spool 4. The bail arm 44 includes a first bail-support member 40, a second bail-support member 42, a line roller 41 and a bail 43. The bail arm 44 freely pivots between a line-guiding position and a line-releasing position, which is opposite from the line-guiding position.

The first bail-support member 40 is pivotably fitted at a forward end of the first rotor arm 31 onto an outer peripheral side of the first rotor arm 31. The line roller 41 guides the fishing line to the spool 4. The line roller 41 is fitted to the forward end of the first bail-support member 40. A second bail-support member 42 is pivotably fitted at a forward end of the second rotor arm 32 onto an outer peripheral side of the second rotor arm 32. The bail 43 is made of wire that is bent into a substantially U shape and is fastened between the line roller 41 and the second bail-support member 42.

Referring to FIG. 2, an anti-reverse mechanism 50 for prohibiting and permitting reversal of the rotor 3 is disposed within the cylindrical portion 30 of the rotor 3. The anti-reverse mechanism 50 has a roller-type one-way clutch 51 and a switching device 52. The clutch 51 has an inner race that is free-rotating. The switching device 52 is for switching the one-way clutch between an operational state (reverse-rotation prohibited state) and a non-operational state (reverse-rotation permitted state).

Figure 6:
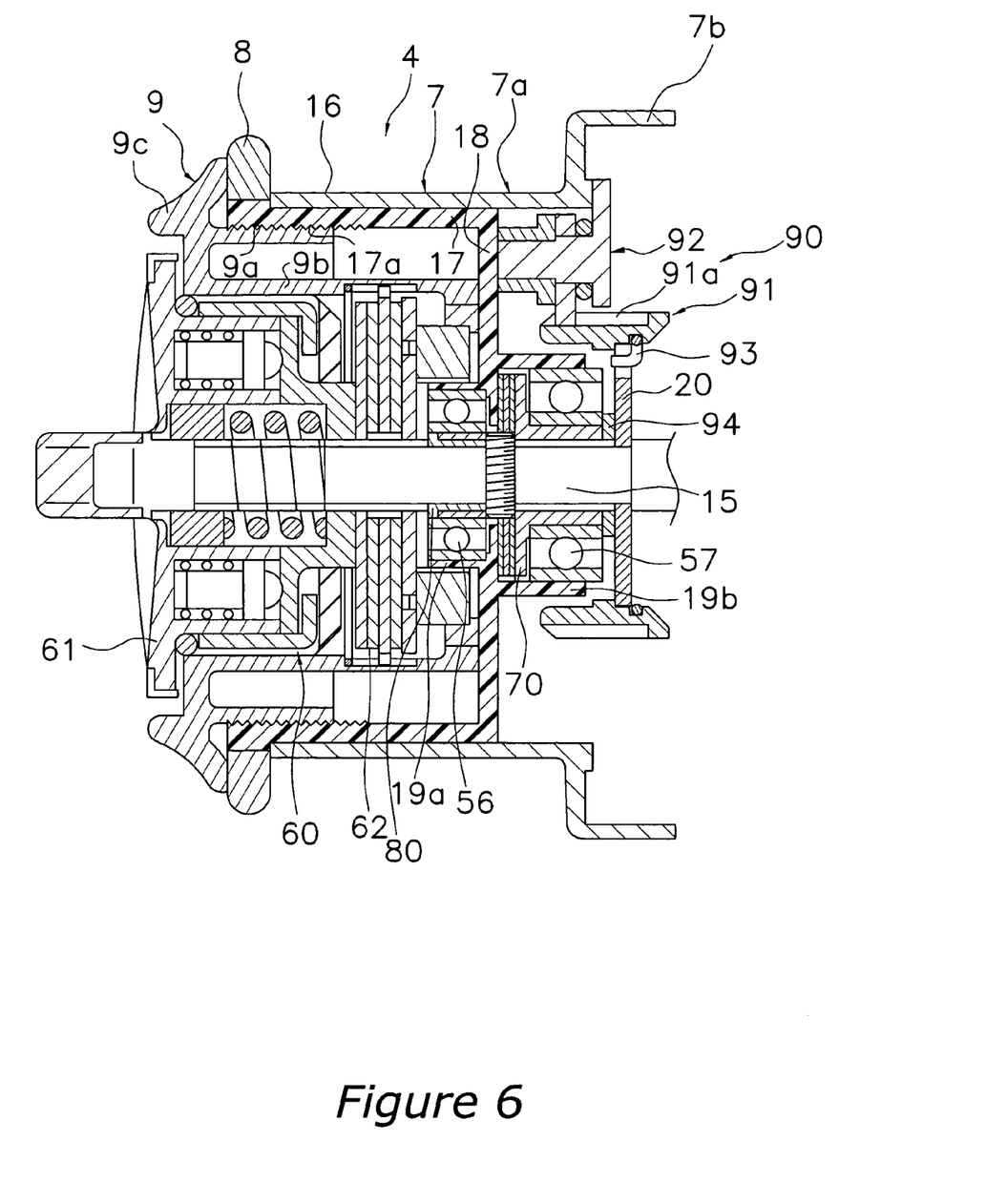
FIG. 6 is a magnified cross-sectional view of a spool of the spinning reel illustrated in FIGS. 1 and 2 equipped with the spinning-reel sounding mechanism according to one embodiment of the present invention.

Referring to FIG. 6, the spool 4 is disposed between the first rotor arm 31 and the second rotor arm 32. The spool 4 is mounted, via the drag mechanism 60, on the forward end of the spool shaft 15. The spool 4 has a spool body 7, a large-diameter flange portion 8 and a flange-fastening member 9. The flange-fastening member 9 is for fastening the flange portion 8 to the spool body 7. The large-diameter flange portion 8 is coupled to the front end of the spool body 7. The spool body 7 has a small diameter portion and a large diameter portion that form a dual-stage, outer circumference onto which the fishing line is wound.

The spool body 7 is obtained by press-working, e.g., drawing aluminum alloy. The spool body 7 is rotatably coupled to the spool shaft 15 by a fifth bearing 56 and a sixth bearing 57. The spool body 7 has a cylindrical bobbin trunk portion 7a, a large-diameter cylindrical skirt portion 7b, a boss portion 7c and a stop portion 7d. The bobbin trunk portion 7a has an outer circumference onto which the fishing line is wrapped. The skirt portion 7b is integrally formed with the bobbin trunk portion 7a on the rear of the bobbin trunk portion 7a. The skirt portion 7b, as illustrated in FIGS. 2, 6, 7 and 8, is a tubular shape that is integral with the bobbin trunk portion 7a so that it covers the cylindrical portion 30 of the rotor 3. The skirt portion 7b is formed of sheet metal obtained by drawing aluminum alloy.

In the foregoing embodiment, the fifth bearing 56 and the sixth bearing 57 were used. However, the invention is not limited to this embodiment and a single bearing configuration, for example, may be employed.

Figure 7:
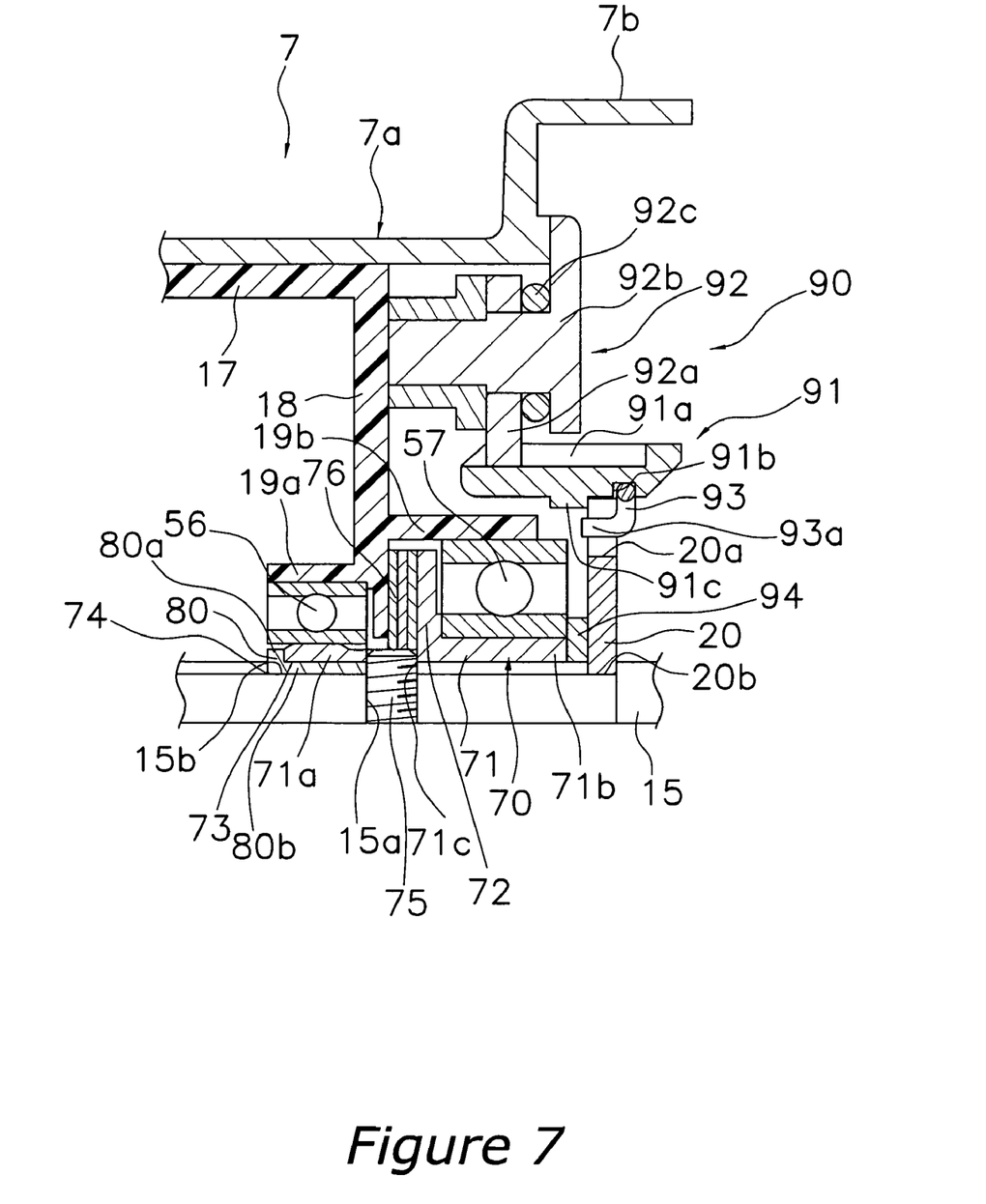
FIG. 7 is a partial magnified cross-sectional view of the spool of the spinning reel illustrated in FIGS. 1, 2 and 6 equipped with the spinning-reel sounding mechanism according to one embodiment of the present invention.
Figure 10:
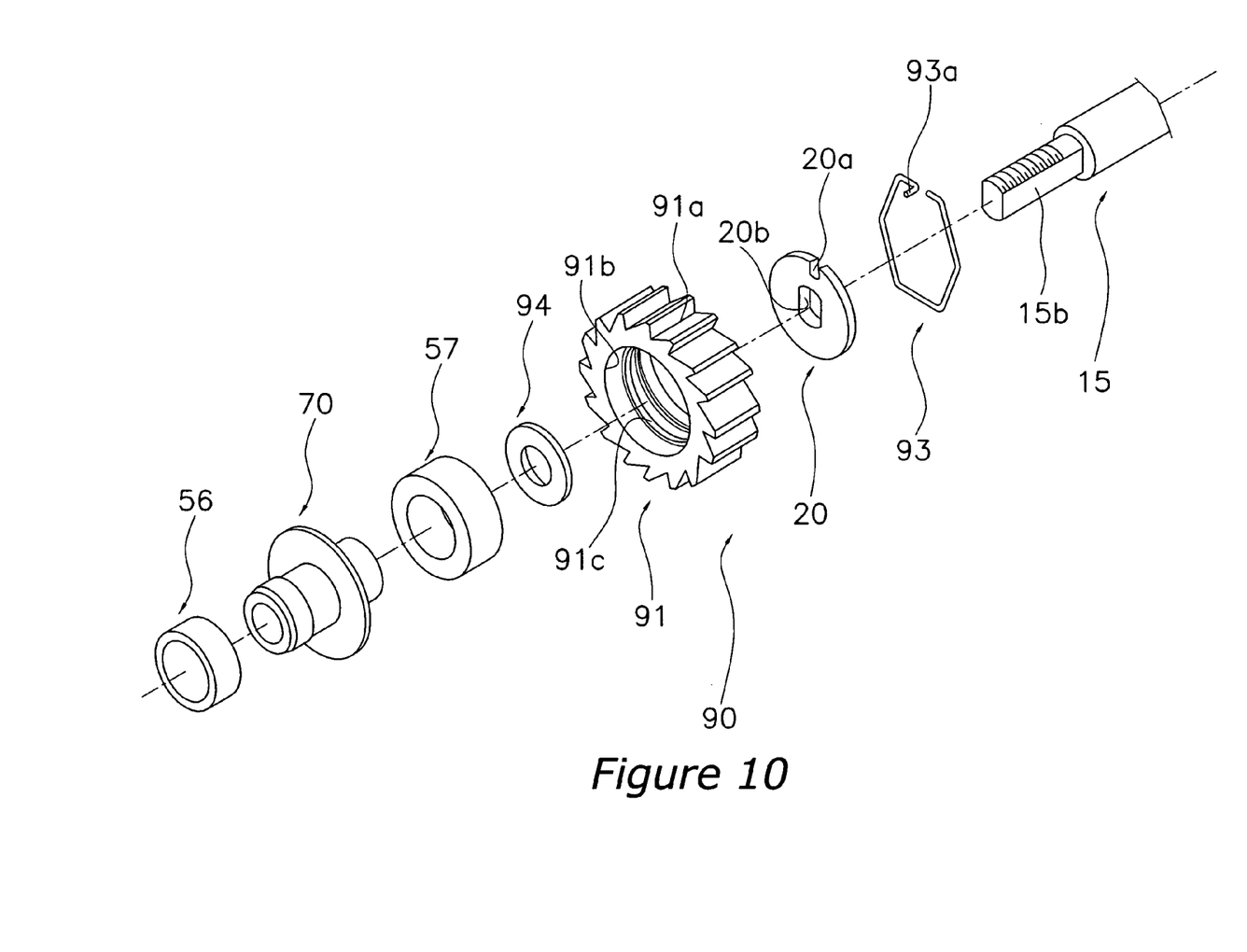
FIG. 10 is an exploded oblique view of the spinning-reel sounding mechanism illustrated in FIGS. 1, 2 and 6–8 according to one embodiment of the present invention.

Referring to FIGS. 6, 7 and 10, the bobbin trunk portion 7a has a tubular portion 16, a cylindrical portion 17 and an annular inner-radius wall 18. The inner-radius wall 18 is formed integrally with the cylindrical portion 17 on a rearward end of the cylindrical portion 17. The tubular portion 16 is formed from a sheet metal plate that is shaped into a tubular shape. The cylindrical portion 17 is bonded onto an inner circumferential surface of the tubular portion 16. The cylindrical portion 17 is made of a synthetic resin. The cylindrical portion 17 has a bobbin female-threaded portion 17a that is formed on an inner peripheral surface of the cylindrical portion 17. The bobbin female-threaded portion 17a mounts the flange-fastening member 9 to the bobbin trunk portion 7a. On the front and rear of the inner-radius wall 18, first and second tubular supporting portions 19a and 19b, having a base, extend substantially perpendicular to the inner-radius wall 18. The fifth bearing 56 and the sixth bearing 57 are mounted inside the first and second supporting portions 19a and 19b, respectively. The fifth bearing 56 and the sixth bearing 57 are rotatably fitted to the spool shaft 15 via a tubular retainer 70.

The flange portion 8 is, as illustrated in FIGS. 2 and 6, a circular plate component made from metal or a hard, scratch-resistant ceramic. The flange portion 8 is fastened by a flange-fastening member 9 that threads into the bobbin female-threaded portion 17a so as to be clamped between the flange-fastening member 9 and the bobbin trunk portion 7a.

As illustrated in FIG. 6, the flange-fastening member 9 includes a tubular male-threaded portion 9a, a tubular drag-housing portion 9b and an abut portion 9c. The male-threaded portion 9a threads into the bobbin female-threaded portion 17a of the bobbin trunk portion 7a. The drag-housing portion 9b is integral with the inner circumferential side of the male-threaded portion 9a. A space in the interior of the tubular drag-housing portion 9b houses portions of the drag mechanism 60. The abut portion 9c is provided on the forward end of the male-threaded portion 9a for abutting on the flange portion 8. An outer circumference of the abut portion 9c inclines upward and rearward.

Referring to FIGS. 2 and 6, the drag mechanism 60 is disposed between the spool 4 and the spool shaft 15. The drag mechanism 60 applies drag force to the spool 4. The drag mechanism 60 includes a knob 61 and a plurality of drag plates 62. The knob 61 is for manually adjusting the drag force. The drag plates 62 are compressed toward the spool 4 by the knob 61. A space in the interior of the tubular drag-housing portion 9b houses the drag plates 62 of the drag mechanism 60.

As illustrated in FIGS. 6, 7, 9 and 10, the retainer 70 is a tubular member. The rearward end of the retainer 70 is in contact with an annular spacer member 94 that contacts the annular member 20. The retainer 70 is pressed rearward by the inner-radius wall 18. The retainer 70 retains the fifth bearing 56 and the sixth bearing 57 on an outer periphery of the retainer 70. An inner periphery of the retainer 70 is fitted non-rotatably onto the non-circular portion 15b of the spool shaft 15.

Figure 9:
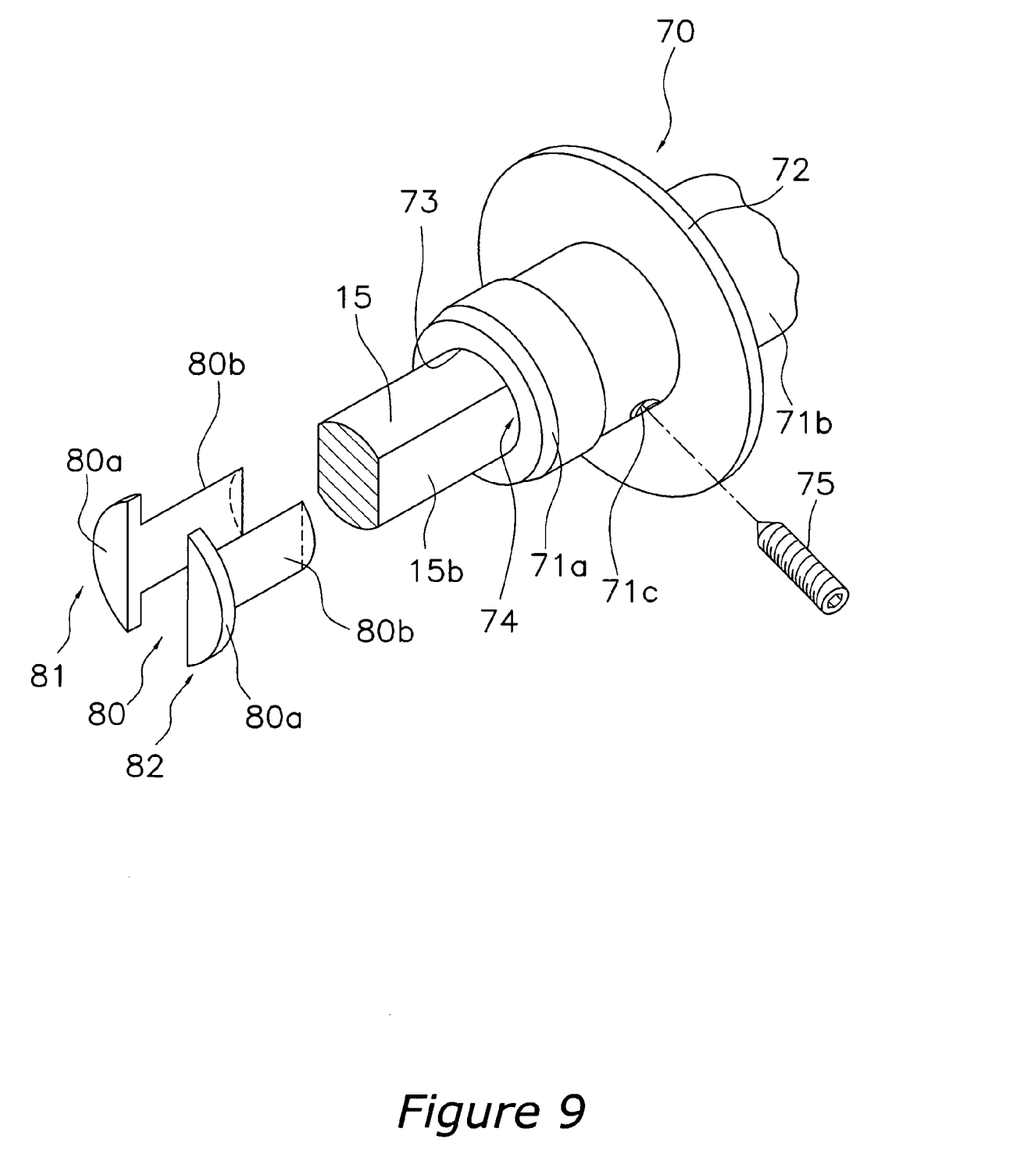
FIG. 9 is an exploded oblique view of a spool shaft and various components attached thereto for the spool of the spinning reel illustrated in FIGS. 1, 2 and 6–8 equipped with the spinning-reel sounding mechanism according to one embodiment of the present invention.

Referring to FIGS. 6, 7 and 9, the retainer 70 includes a retaining portion 71, a pressing part 72 and a circular portion 73. The inner circumference of the retaining portion 71 is non-rotatably fitted to the non-circular portion 15b of the spool shaft 15. The pressing part 72 is provided on an outer periphery of the retaining portion 71 so that a frontward face of the pressing part 72 faces the inner-radius wall 18. The circular portion 73 has a circular cross-sectional shape. The circular portion 73 is fitted to the spool shaft 15 so that two clearances 74 are formed between the circular portion 73 and the non-circular portion 15b. Each of the clearances 74 has a cross-section that is substantially bow shaped. The retaining portion 71 includes a first retaining section 71a, a second retaining section 71b and a through hole 71c. The first retaining section 71a is adjacent the frontward face of the pressing part 72. The fifth bearing 56 is disposed on an outer circumference of the first retaining section 71a. The second retaining section 71b is disposed on the rear of the pressing part 72. The sixth bearing 57 is disposed on an outer circumference of the second retaining section 71b.

The retainer 70 is non-rotatably fastened to the non-circular portion 15b of the spool shaft 15 by a pin member 75, such as an Allen hex set screw. The pin member 75 passes through the through hole 71c and is threaded into the spool female-threaded portion 15a formed in the spool shaft 15. On the first retaining section 71a, three spacer members 76 are placed between the frontward face of the pressing part 72 and the inner-radius wall 18. A wobbling prevention member 80 prevents the retainer 70 from wobbling. The wobbling prevention member 80 is fitted into the clearances 74 between the circular portion 73 of the retainer 70 and the non-circular portion 15b of the spool shaft 15. It will be apparent to one of skill in the art from this disclosure that other methods may be adopted to fasten the retainer 70 to the spool shaft 15.

Referring to FIG. 9, the wobbling prevention member 80 includes a first wobbling prevention element 81 and a second wobbling prevention element 82 that are formed to be mirror images of each other. Each of the wobbling prevention members 80 has a large-diameter head 80a and a mounting portion 80b fitted into the clearances 74. The heads 80a have outer shapes that are substantially bow shaped in cross section and are configured to abut a forward end of the retainer 70 when the mounting portions 80b are slipped into the clearances 74. The mounting portions 80b are formed integrally with the heads 80a so as to face each other. The mounting portions 80b are substantially bow shaped so that their cross-sectional shapes match that of the clearances 74.

Referring to FIGS. 6–8 and 10, the sounding mechanism 90 is attached to the rear end of the bobbin trunk portion 7a. The sounding mechanism 90 includes an annular member 20, a first sounding part 91, a second sounding part 92 and a rotation-restricting member 93. The rotation-restricting member 93 restricts the rotation of the first sounding part 91. The annular member 20 is fitted with its rearward movement restricted. The first and second sounding parts 91 and 92 emit sound by means of relative rotation between the spool 4 and the spool shaft 15.

As illustrated in FIGS. 6–8 and 10, the annular member 20 is non-rotatably coupled to the spool shaft 15 and immovable in an axial rearward direction of the spool shaft 15. The tubular first sounding part 91 is rotatably coupled to the annular member 20 along an outer periphery of the annular member 20. The second sounding part 92 repeatedly collides with the first sounding part 91 to generate sound when the spool 4 spins in the fishing-line reel-out direction. The rotation-restricting member 93 is disposed between the annular member 20 and the first sounding part 91 for restricting rotation of the first sounding part 91.

The annular member 20 is a metal ring member fitted non-rotatably and non-reciprocatably to the spool shaft 15. The annular member 20 is located at a rearward end of the non-circular portion 15b and abuts a portion of the spool shaft 15. The annular member 20 has a notch 20a and a non-circular hole 20b. The notch 20a is formed by cutting out a portion of an outer periphery of the annular member 20. The non-circular hole 20b is in a non-circular shape and runs through the annular member 20. The non-circular hole 20b is formed so that the non-circular portion 15b of the spool shaft 15 can pass therethrough. The non-circular hole 20b is in contact with the rearward end of the non-circular portion 15b. An annular spacer member 94 is interposed between the annular member 20 and the sixth bearing 57. This makes it possible to receive the entire spool 4 by fastening the annular member 20 to the spool shaft 15 even when the inner-radius wall 18 is pressed rearward by the drag mechanism 60.

As shown in FIGS. 6–8 and 10, the first sounding part 91 is a tubular ratchet wheel in which the annular member 20 is fitted on an inner surface of the first sounding part 91 in a rearward portion of the first sounding part 91. The first sounding part 91 includes a plurality of saw-tooth portions 91a, a groove portion 91b and a projecting portion 91c. The projecting portion 91c is ring shaped and centered on the inner surface of the first sounding part 91. The projecting portion 91c protrudes radially inwardly so as to restrict forward movement of the annular member 20. The saw-tooth portions 91a are circumferentially spaced on an outer periphery of the first sounding part 91. Each of the saw-tooth portions 91a is in a saw-tooth shape that permits the spool 4 to rotate only in the line reel-out direction. The groove portion 91b is formed in the inner surface of the first sounding part 91 in the rearward portion of the first sounding part 91. A clearance is provided between the inner surface of the first sounding part 91 and the sixth bearing 57. In other words, the inner diameter of the first sounding part 91 is larger than the outer diameter of the sixth bearing 57.

Figure 8:
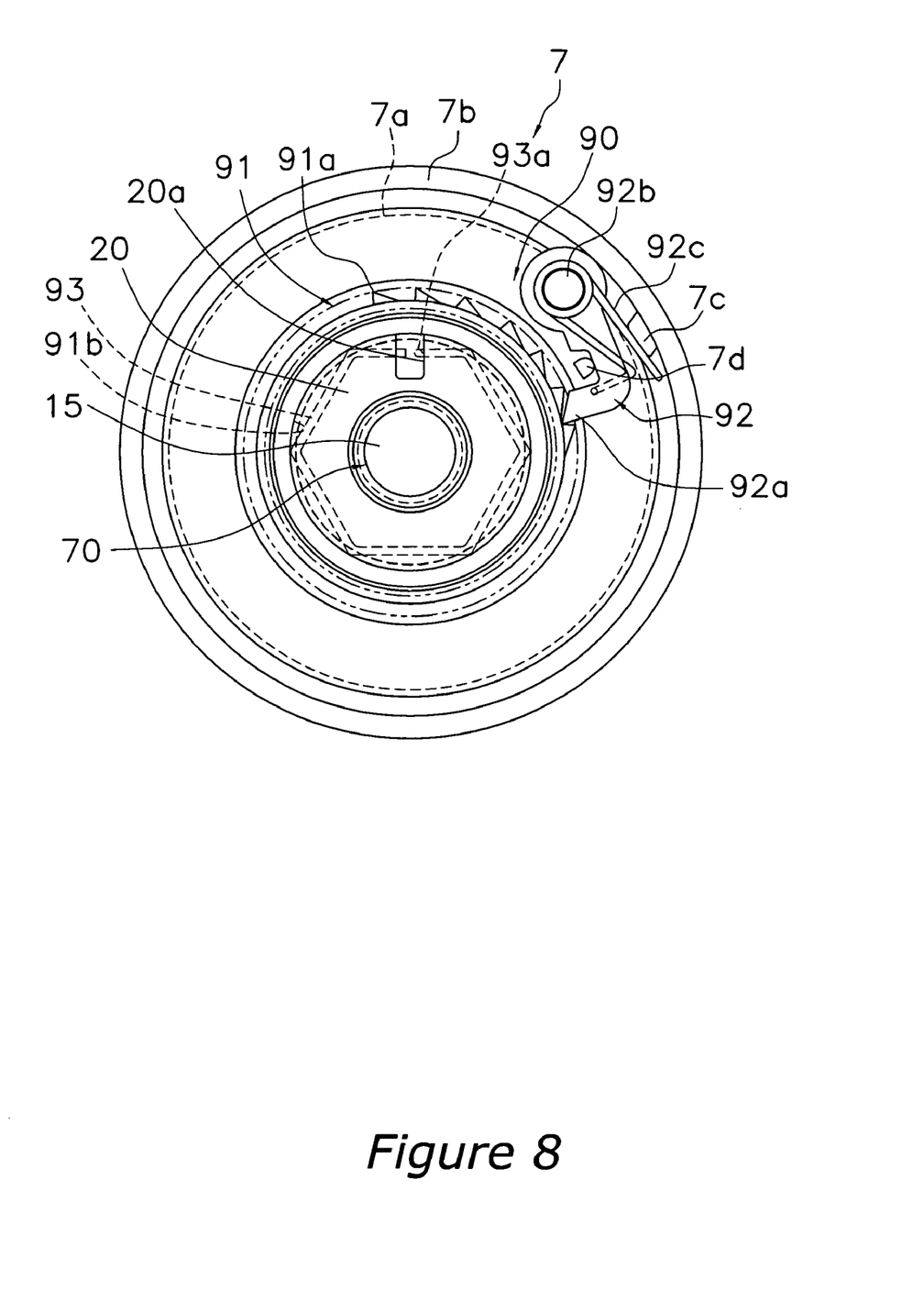
FIG. 8 is a cross-sectional rearward view of the spool of the spinning reel illustrated in FIGS. 1, 2, 6 and 7 equipped with the spinning-reel sounding mechanism according to one embodiment of the present invention.

As illustrated in FIG. 8, the second sounding part 92 includes a hooked pawl member 92a, a supporting member 92b, and a spring element 92c. The hooked pawl member 92a pivots freely from the rearward end of the bobbin trunk portion 7a such that a forward end of the hooked pawl member 92a abuts the saw-tooth portions 91a. The supporting member 92b pivotably supports the hooked pawl member 92a. The hooked pawl member 92a is configured and arranged to be pivotably coupled to the spool 4 to enable the forward end of the hooked pawl member 92a to abut the saw-tooth portions 91a. The spring element 92c urges the forward end of the hooked pawl member 92a toward the saw-tooth portions 91a. One end of the spring element 92c is latched on the boss portion 7c, which is elevated on the rearward end of the bobbin trunk portion 7a. The other end of the spring element 92c is attached to the hooked pawl member 92a. On the rearward end of the bobbin trunk portion 7a, the stop portion 7d is elevated for restricting excessive shifting of the hooked pawl member 92a. When the spool 4 spins in the fishing-line reel-out direction, the forward end of the hooked pawl member 92a repeatedly collides with the saw-tooth portions 91a, thereby making a sound.

It will be apparent to one of skill in the art from this disclosure that the spring element 92c may be eliminated. Moreover, the hooked pawl member 92a may be a tongue-like shaped member that is made of synthetic resin and is capable of colliding with the saw-tooth portions 91a.

The rotation-restricting member 93 is a metal spring member bent into a substantially polygonal shape. Preferably, the rotation-restriction member 93 is substantially hexagonal in shape. The rotation-restricting member 93 is coupled to the first sounding part 91 by biasing the rotation-restricting member 93 against the first sounding part 91. Specifically, the rotation-restricting member 93 is fitted into the groove portion 91b of the first sounding part 91. Accordingly, the rotation-restriction member 93 retains the annular member 20 by urging the annular member 20 towards the projecting portion 91c of the first sounding part 91. The rotation-restricting member 93 is fitted into the groove portion 91b. The rotation-restricting member 93 is disposed so that its outer peripheral apexes come into contact with the inner circumferential part of the groove portion 91b under the biasing force. The rotation-restricting member 93 is a filamentous element. An end of the rotation-restricting member 93 is further bent axially forward, thereby forming an interlocking portion or bent end 93a that latches into the notch 20a of the annular member 20. The interlocking portion 93a of the rotation-restricting member 93 latches onto the annular member 20. Therefore, rotation of the first sounding part 91 relative to the spool shaft 15 can be restricted.

It will be apparent to one of skill in the art from this disclosure that the rotation-restricting member 93 is not limited to a metal spring member and that other biasing members or elastic members may be used for biasing against the first sounding part 91.

It will also be apparent to one of skill in the art from this disclosure that the annular member 20 and the rotation-restricting member 93 may be fitted from the front of the first sounding part 91. In this case, it is necessary that the projecting portion 91c of the first sounding part 91 be formed rearward of the groove portion 91b to restrict rearward movement of the annular member 20. At the same time, it is necessary that the interlocking portion 93a of the rotation-restricting member 93 be bent axially rearward so as to be latched into the notch 20a of the annular member 20.

Next, handling and operations of the reel unit 2 in accordance with the present invention will now be described.

When casting, the bail arm 44 is flipped over into a line-releasing position. The first bail-support member 40 and the second bail-support member 42 pivot accordingly. The fishing rod is cast in this state, with the index finger of the hand that grips the fishing rod hooking the fishing line. The fishing line is thereupon flung out vigorously under the weight of the terminal tackle. When the handle 1 is rotated in the line-retrieving direction after the terminal tackle has landed in the water, the rotor drive mechanism 5 causes the rotor 3 to rotate in the fishing-line reel-in direction. A bail-flipping mechanism (not shown) returns the bail arm 44 into the fishing-line-retrieving position and the casting-out of the fishing line stops because the rotor 3 is prohibited from reverse rotation.

To reel-in the fishing line, the handle 1 is rotated in the fishing-line reel-in direction. The rotation is then transmitted via the master gear 11 and the pinion gear 12 to the rotor 3. When the rotor 3 rotates, the fishing line, guided by the line roller 41, is wrapped onto the spool 4.

The first sounding part 91 is formed so that it can permit the spool 4 to rotate only in the fishing-line reel-out direction. The first sounding part 91 is configured to permit the spool 4 to rotate only in the fishing-line reel-out direction only when the drag mechanism 60 operates. Only when the spool 4 spins in the fishing-line reel-out direction does the second sounding part 92 makes contact with the first sounding part 91 and therefore produce sound.

Although the foregoing embodiment used a shallow-channel type spool, the present invention is not limited thereto and may be applied to any other type of spinning reel spool.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention and relative to the view of the angler standing behind the reel unit 2.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiment.

What is claimed is:

1. A spinning-reel sounding mechanism comprising:
   a non-rotatable spool shaft;
   an annular member non-rotatably coupled to the spool shaft and immovable in an axial rearward direction of the spool shaft;
   a tubular first sounding part rotatably coupled to the annular member along an outer periphery of the annular member and having a plurality of saw-tooth portions circumferentially spaced on an outer periphery of the first sounding part, each of the saw-tooth portions being configured and arranged in a saw-tooth shape that permits a spool to rotate only in a fishing-line reel-out direction;
   a second sounding part configured and arranged to be coupled to the spool to enable a distal end of the second sounding part to abut at least one of the saw-tooth portions in order to emit sound by the distal end repeatedly colliding with the saw-tooth portions when the spool rotates in the fishing-line reel-out direction; and a rotation-restricting member disposed between the annular member and the first sounding part for restricting rotation of the first sounding part.

2. The spinning-reel sounding mechanism as set forth in claim 1, wherein
the rotation-restricting member is coupled to the first sounding part by biasing the rotation-restricting member against the first sounding part.

3. The spinning-reel sounding mechanism as set forth in claim 2, wherein
the first sounding part further has a groove portion formed circumferentially along an inner-peripheral surface of the first sounding part.

4. The spinning-reel sounding mechanism as set forth in claim 3, wherein
the rotation-restricting member is fitted into the groove portion.

5. The spinning-reel sounding mechanism as set forth in claim 4, wherein
the annular member has a notch formed by cutting out a portion of the outer periphery of the annular member.

6. The spinning-reel sounding mechanism as set forth in claim 5, wherein
the rotation-restricting member includes a filamentous element having a bent end that is latched into the notch.

7. The spinning-reel sounding mechanism as set forth in claim 6, wherein
the rotation-restricting member includes a spring member bent into a substantially polygonal shape.

8. The spinning-reel sounding mechanism as set forth in claim 6, wherein
the second sounding part includes a pawl member and a spring element for urging a forward end of the pawl member against the saw-tooth portions and the pawl member is configured and arranged to be pivotably coupled to the spool to enable the forward end of the pawl member to abut the saw-tooth portions.

9. The spinning-reel sounding mechanism as set forth in claim 2, wherein
the second sounding part includes a pawl member and a spring element for urging a forward end of the pawl member against the saw-tooth portions and the pawl member is configured and arranged to be pivotably coupled to the spool to enable the forward end of the pawl member to abut the saw-tooth portions.

10. The spinning-reel sounding mechanism as set forth in claim 1, wherein
the second sounding part includes a pawl member and a spring element for urging a forward end of the pawl member against the saw-tooth portions and the pawl member is configured and arranged to be pivotably coupled to the spool to enable the forward end of the pawl member to abut the saw-tooth portions.

11. A spinning reel comprising:
a handle;
a reel unit rotatively supporting the handle;
a rotor rotatively supported on a front of the reel unit;
a spool disposed at a front of the rotor; and
a spinning-reel sounding mechanism for producing sound by relative rotation between the spool and the reel unit including:
a non-rotatable spool shaft,
an annular member non-rotatably coupled to the spool shaft and immovable in an axial rearward direction of the spool shaft,
a tubular first sounding part rotatably coupled to the annular member along an outer periphery of the annular member and having a plurality of saw-tooth portions circumferentially spaced on an outer periphery of the first sounding part, each of the saw-tooth portions being configured and arranged in a saw-tooth shape that permits the spool to rotate only in a fishing-line reel-out direction,
a second sounding part coupled to the spool to enable a distal end of the second sounding part to abut at least one of the saw-tooth portions in order to emit sound by the distal end repeatedly colliding with the saw-tooth portions when the spool rotates in the fishing-line reel-out direction, and
a rotation-restricting member disposed between the annular member and the first sounding part for restricting rotation of the first sounding part.

12. The spinning reel as set forth in claim 11, wherein
the rotation-restricting member is coupled to the first sounding part by biasing the rotation-restricting member against the first sounding part.

13. The spinning reel as set forth in claim 12, wherein
the first sounding part further has a groove portion formed circumferentially along an inner-peripheral surface of the first sounding part.

14. The spinning reel as set forth in claim 13, wherein
the rotation-restricting member is fitted into the groove portion.

15. The spinning reel as set forth in claim 14, wherein
the annular member has a notch formed by cutting out a portion of the outer periphery of the annular member.

16. The spinning reel as set forth in claim 15, wherein
the rotation-restricting member includes a filamentous element having a bent end that is latched into the notch.

17. The spinning reel as set forth in claim 16, wherein
the rotation-restricting member includes a spring member bent into a substantially polygonal shape.

18. The spinning reel as set forth in claim 16, wherein
the second sounding part includes a pawl member and a spring element for urging a forward end of the pawl member against the saw-tooth portions and the pawl member is configured and arranged to be pivotably coupled to the spool to enable the forward end of the pawl member to abut the saw-tooth portions.

19. The spinning reel as set forth in claim 12, wherein
the second sounding part includes a pawl member and a spring element for urging a forward end of the pawl member against the saw-tooth portions and the pawl member is configured and arranged to be pivotably coupled to the spool to enable the forward end of the pawl member to abut the saw-tooth portions.

20. The spinning reel as set forth in claim 11, wherein
the second sounding part includes a pawl member and a spring element for urging a forward end of the pawl member against the saw-tooth portions and the pawl member is configured and arranged to be pivotably coupled to the spool to enable the forward end of the pawl member to abut the saw-tooth portions.

* * * * *